United States Patent
Chen

(10) Patent No.: US 10,662,552 B1
(45) Date of Patent: May 26, 2020

(54) FIELD CONTROLLED DIRECT-WRITE ELECTROSPINNING

(71) Applicant: Xing Chen, Plainfield, IL (US)

(72) Inventor: Xing Chen, Plainfield, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 533 days.

(21) Appl. No.: 15/240,168

(22) Filed: Aug. 18, 2016

Related U.S. Application Data

(63) Continuation of application No. 14/803,339, filed on Jul. 20, 2015, now abandoned.

(51) Int. Cl.
  *D01D 5/00* (2006.01)
  *B33Y 10/00* (2015.01)
  *B33Y 30/00* (2015.01)

(52) U.S. Cl.
  CPC ............ *D01D 5/0007* (2013.01); *B33Y 10/00* (2014.12); *B33Y 30/00* (2014.12); *D10B 2401/00* (2013.01)

(58) Field of Classification Search
  None
  See application file for complete search history.

(56) References Cited

U.S. PATENT DOCUMENTS

| | | | |
|---|---|---|---|
| 2010/0222771 A1* | 9/2010 | Mitchell | A61L 27/14 606/1 |
| 2014/0083859 A1* | 3/2014 | Baeumner | B81B 1/006 204/601 |

OTHER PUBLICATIONS

Xing Chen, et al., "Fabrication, Formation Mechanism, and Magnetic Properties of Metal Oxide Nanotubes via Electrospinning and Thermal Treatment," J. Phys. Chem C 2011, 115, pp. 373-378.
Jonwan Lee, et al., "Fabrication of Patterned Nanofibrous Mats Using Direct-Write Electrospinning," ACS Publications, Apr. 28, 2012, 2012 American Chemical Society, pp. 7267-7275.

* cited by examiner

*Primary Examiner* — Michael P. Rodriguez
(74) *Attorney, Agent, or Firm* — Cherskov Flaynik & Gurda, LLC

(57) ABSTRACT

The invention provides a method for producing fibers, the method having the steps of producing electrospun fiber; and directing the fiber to a plurality of targets, whereby only one of the targets is grounded at any one time. Also provided is a system for producing anisotropic fibers having a reservoir of electrospun fiber constituent' wherein an egress point of the reservoir is electrically charged; a plurality of electrodes opposed to the egress point, wherein only one of the electrodes is grounded at any one time while the remaining electrodes are at an initial floating voltage state; and a target substrate disposed between the egress point and the plurality of electrodes.

8 Claims, 11 Drawing Sheets
(7 of 11 Drawing Sheet(s) Filed in Color)

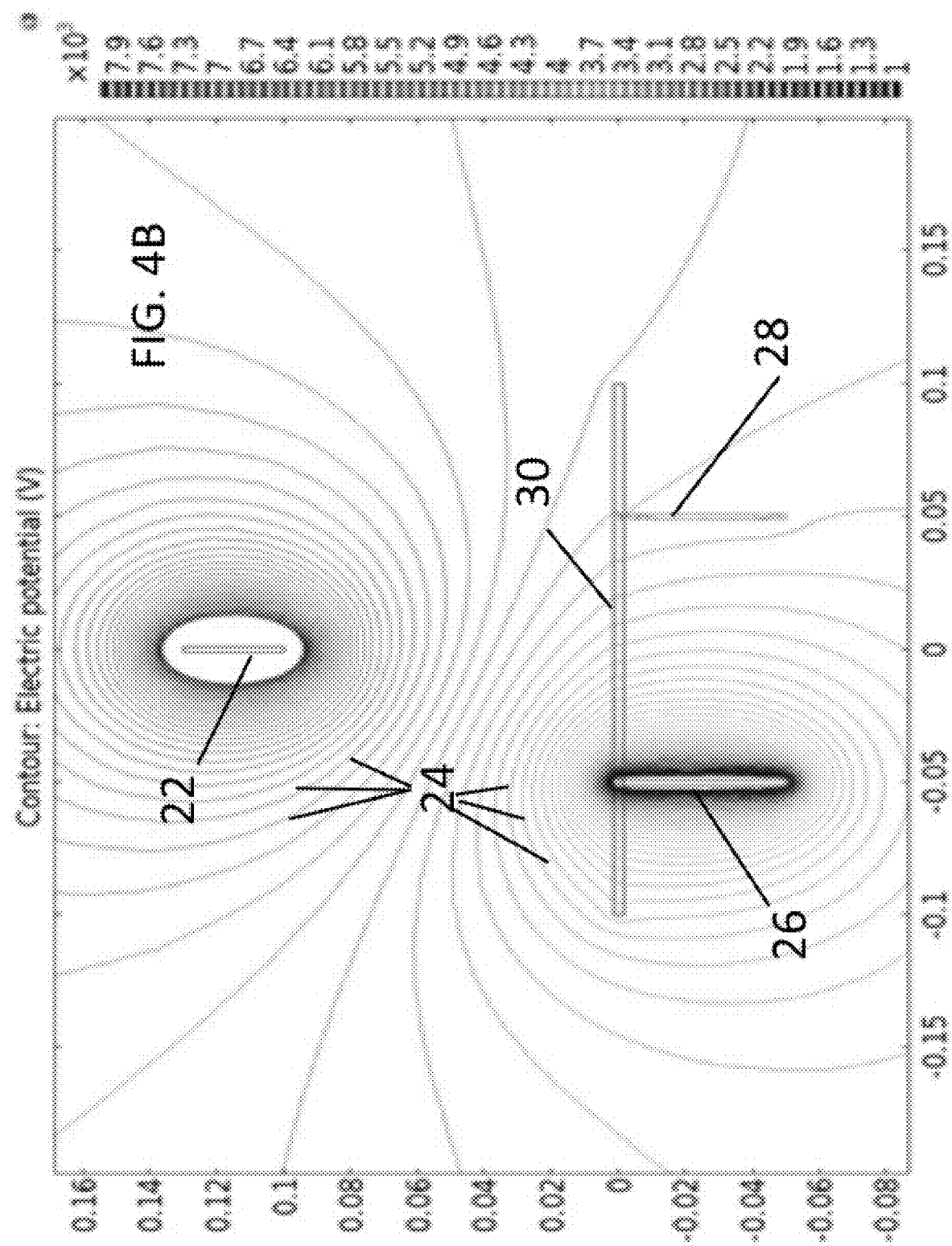

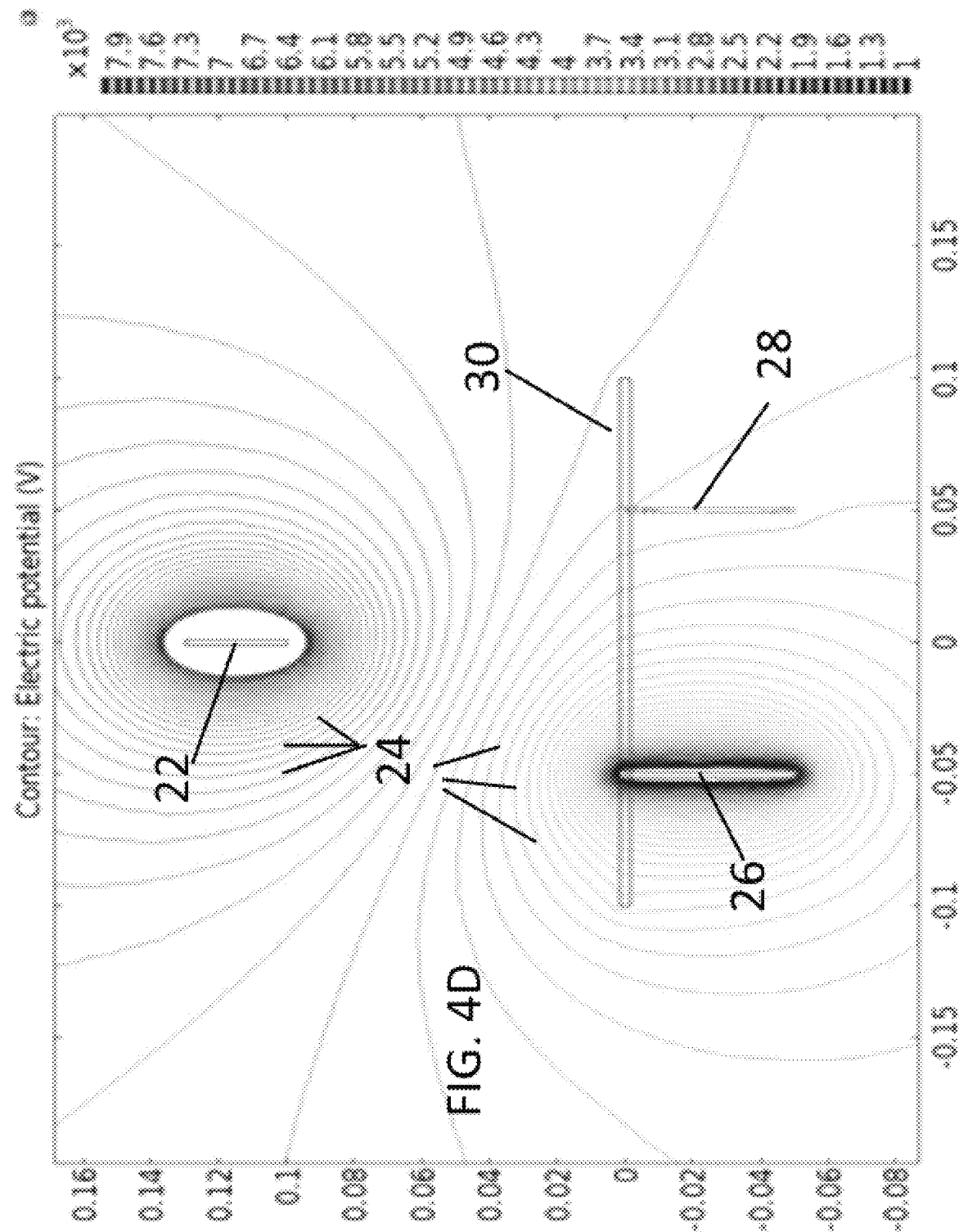

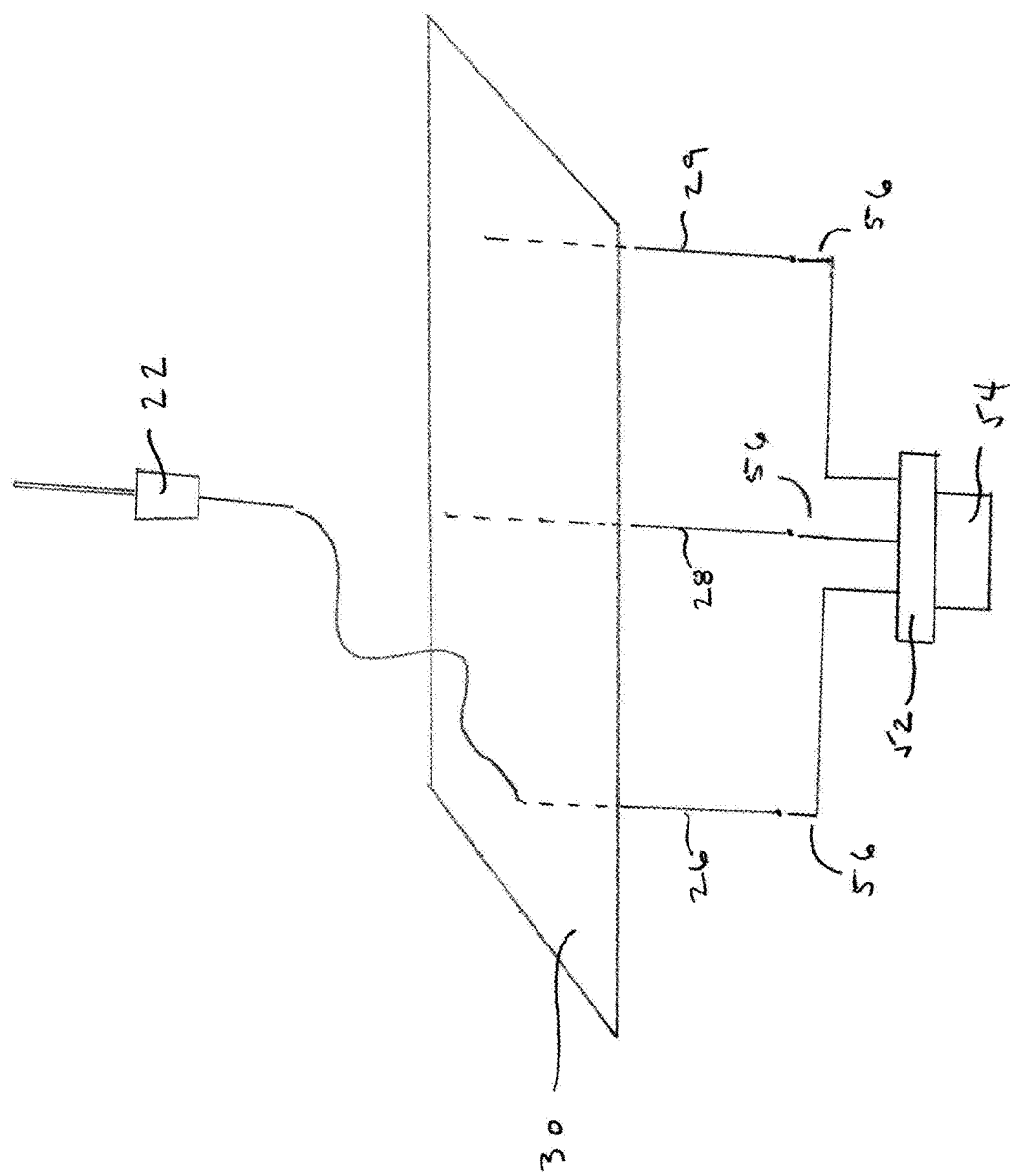

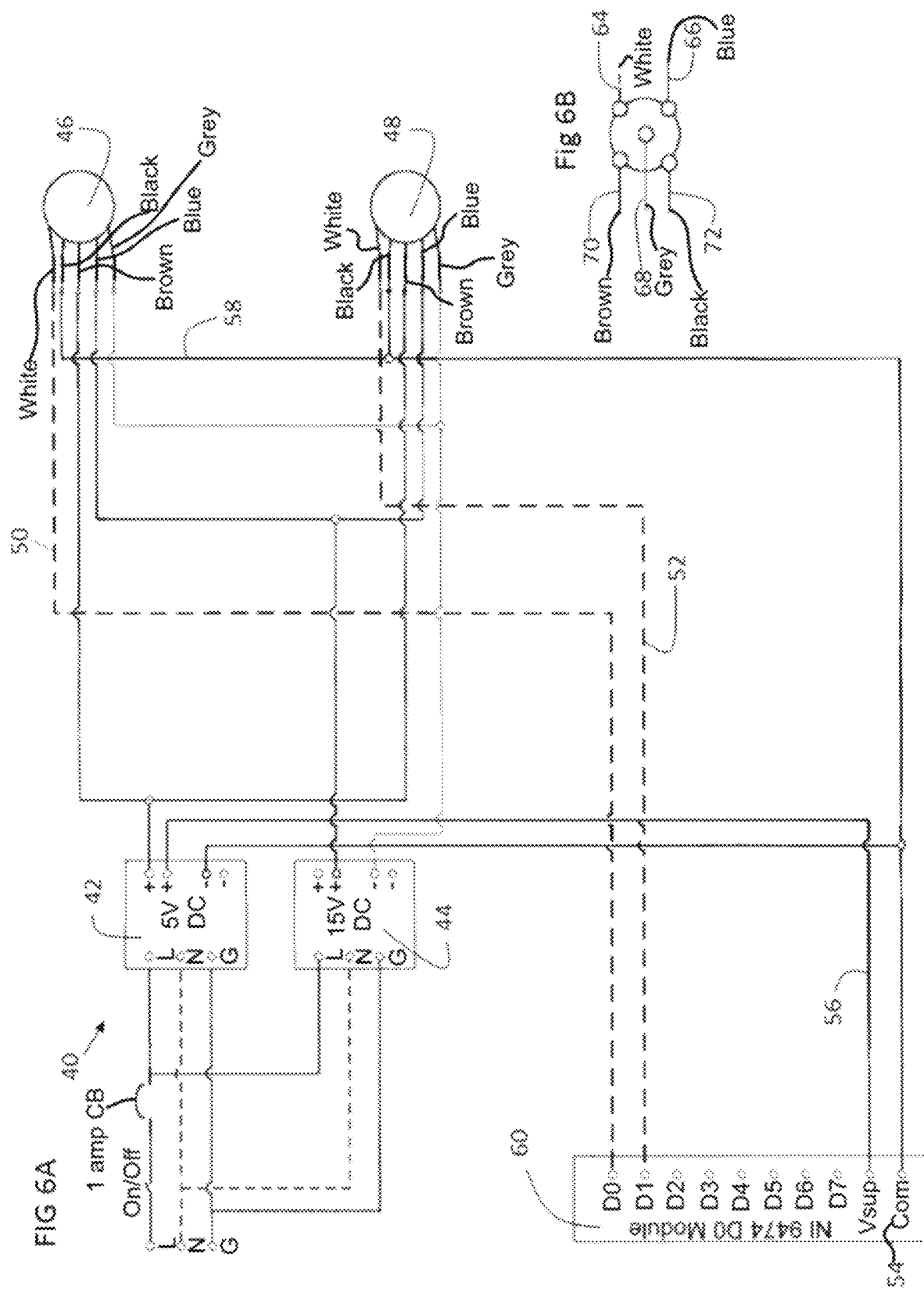

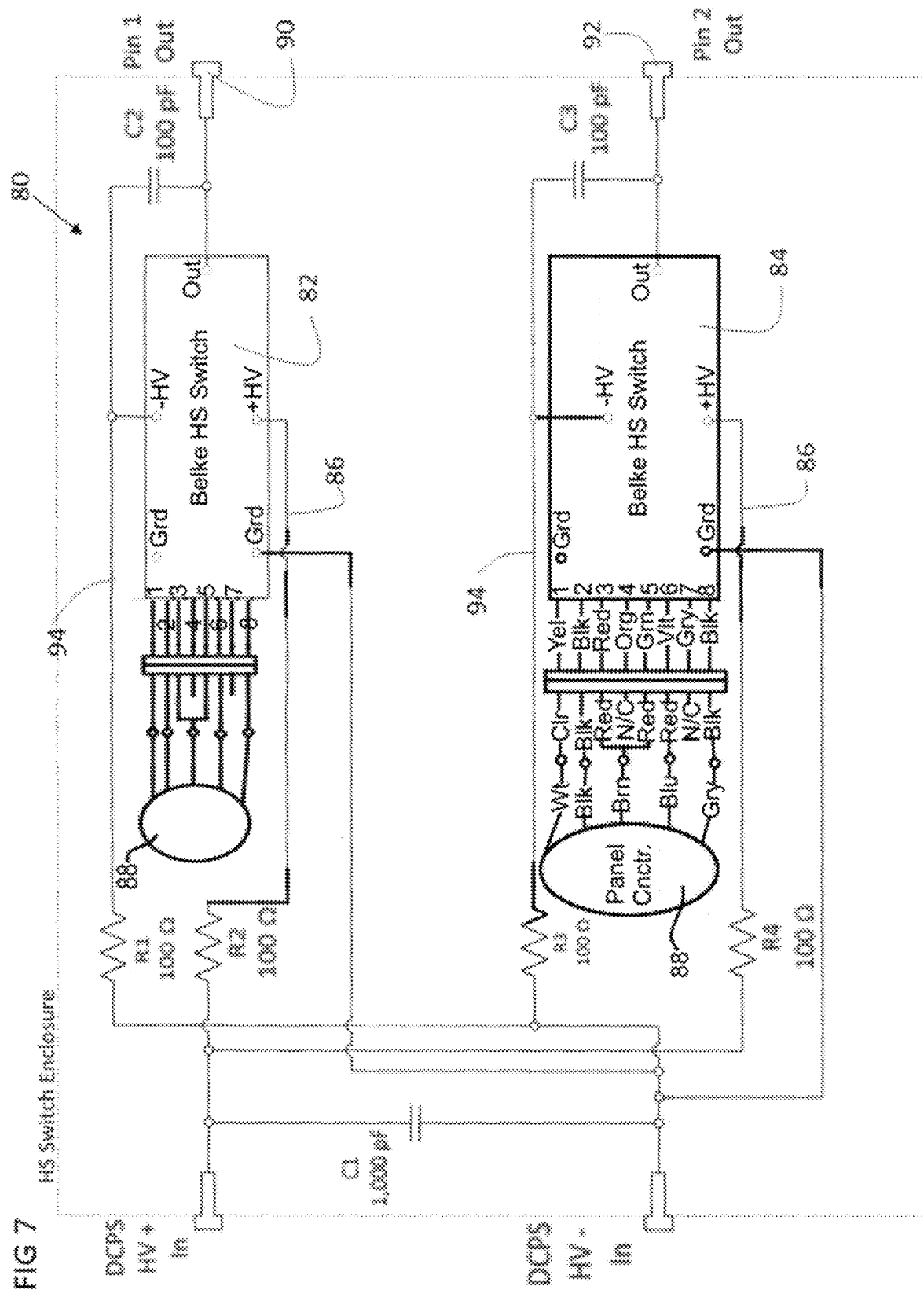

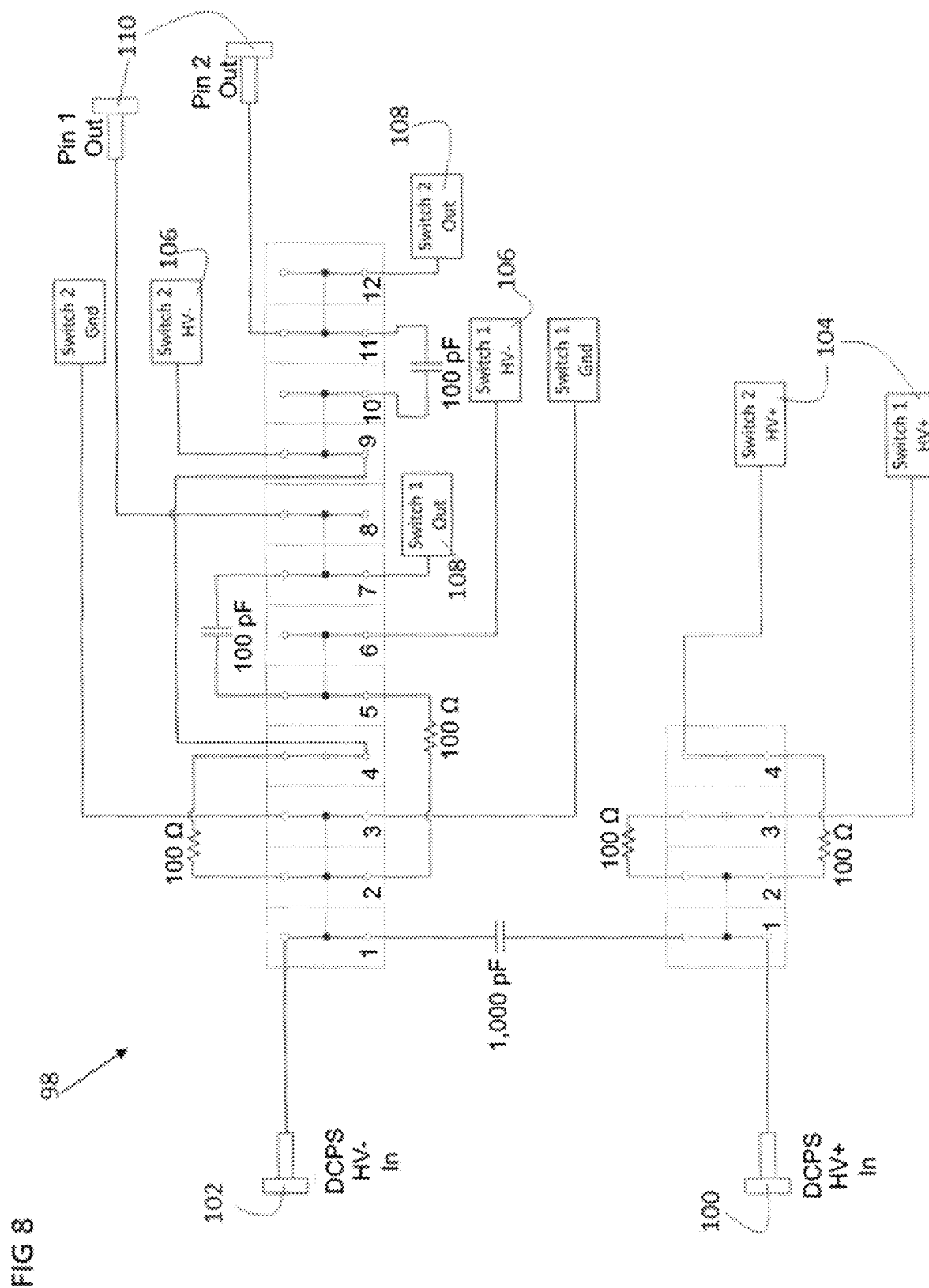

ly, the method should
easily adopt mechanically moving hardware to facilitate the
deposition of anisotropic fibers in complex patterns.

FIELD CONTROLLED DIRECT-WRITE ELECTROSPINNING

PRIORITY CLAIM

This Utility Patent Application Claims priority benefit as a Continuation of U.S. Non-Provisional application Ser. No. 14/803,339, filed on Jul. 20, 2015, presently pending.

CONTRACTUAL ORIGIN OF THE INVENTION

The U.S. Government has rights in this invention pursuant to Contract No. DE-AC02-06CH11357 between the U.S. Department of Energy and UChicago Argonne, LLC, representing Argonne National Laboratory.

BACKGROUND OF THE INVENTION

1. Field of the Invention

This invention relates to production of narrow fibers and more specifically, this invention relates to a method for producing anisotropic fibers via electrospinning.

2. Background of the Invention

Electrospinning is rapidly becoming a popular technology with a myriad of applications in many different fields and industries. Fibers having nano-scale diameters (i.e., below 1000 nanometers (nm)), called nanofibers, exhibit a high aspect ratio and provide a very large degree of anisotropy These characteristics enhance energy transfer efficiency and other beneficial parameters in many technology fields, such as thermoelectric, photoelectric and RF/microwave applications. Electrospun nanofibers can be greatly superior in these fields when compared to bulk materials.

FIG. 1 depicts a prior art configuration, designated as numeral 10, for generating fibers. By nature of electrospinning, the deposition of electrospun fibers are random in orientation due to the instability of the convective flow stage 12 of fiber formation, as shown in FIG. 1. It is during this stage that bends develop throughout the length of the fiber 11, where electrostatic repulsion results in rapid, random spatial orientation before the fiber settles on a collection target 14.

Many different approaches have been developed in directing and aligning electrospun nanofiber. Rotating collectors allow the fiber to be pulled radially to create a degree of alignment. One such configuration is disclosed in the inventor's U.S. patent application Ser. No. 14/665,932, the entirety of which is incorporated by reference.

Often, very high rotational speeds are required in rotating systems as the fiber gets thinner. Even at high speeds, stray fibers cannot be eliminated. Furthermore, while specific collector geometries also allow for anisotropic alignment of the fiber, the distribution of deposition across the entire collector is often uncontrolled.

Other methods involve targeting the electrospinning spray to a specific point. These single point electrodes allow for "writing" with electrospun fiber, where tight geometric patterns can be created.

Current methodologies, however, dictate that in order to direct the pattern, either the point electrode move, or the collector stage move relative to a fixed electrode. This mechanical movement creates a variety of problems. In addition to limitations of scale, the mechanical movement of the system would have to be very fast (up to 1 kilometer per second, km/s) if one wanted to create straight, aligned nanofiber of a small diameter. The movement speed limits how thin the nanofiber can be drawn, restricting the number of potential applications for the technology.

A need exists in the art for a method to reproducibly manufacture and deposit extremely thin (less than about 1000 nm) fibers in predetermined patterns or packing densities. The method should not require the mechanical movement of hardware associated with the manufacturing and depositing, so as to allow for the generation of the aforementioned thin fibers. Alternatively, the method should easily adopt mechanically moving hardware to facilitate the deposition of anisotropic fibers in complex patterns.

SUMMARY OF INVENTION

An object of the invention is to provide a method for producing anisotropic fibers that overcomes many of the drawbacks of the prior art.

Another object of the invention is to provide a method for producing fibers. A feature of the invention is that only the electrical status of components are manipulated to control electrical field geometry, such that no mechanical movement of hardware is required to produce and actively steer fibers to predetermined configurations and subconstructs. An advantage of the invention is that high aspect ratio structures are precisely and reproducibly manufactured as building blocks for macroscopic construction of highly ordered structures.

Still another object of the present invention is to provide highly ordered and geometrically tuned nanofibers (e.g., fibers with diameters between approximately 30 nm and approximately 2000 nm). A feature of the invention is that the fibers are precisely positioned relative to each other solely through the application of electrical fields. An alternative feature of the invention is that the fibers are deposited in more variable and complicated deposition patterns when aspects of the deposition hardware are physically moved during the aforementioned field deposition steps. An advantage of the invention is that the resulting fiber matrix comprises highly anisotropic nanofibers (e.g. ratios greater than about 10 and typically 1000 or greater) tuned to a reproducible simple matrix-or variable matrix-pattern.

Briefly, the invention provides a method for producing fibers, the method comprising producing electrospun fiber; and directing the fiber to a plurality of targets, whereby only one of the targets is grounded at any one time.

Also provided is a system for producing anisotropic fibers comprising a reservoir of electrospun fiber constituent' wherein an egress point of the reservoir is electrically charged; a plurality of electrodes opposed to the egress point, wherein only one of the electrodes is grounded at any one time while the remaining electrodes are at an initial floating voltage state; and a target substrate disposed between the egress point and the plurality of electrodes.

BRIEF DESCRIPTION OF THE DRAWING

The patent or application file contains at least one drawing executed in color. Copies of this patent or patent application publication with color drawing(s) will be provided by the Office upon request and payment of the necessary fee.

The invention together with the above and other objects and advantages will be best understood from the following detailed description of the preferred embodiment of the invention shown in the accompanying drawings, wherein:

FIGS. 4A-D depict a time lapse depiction of electric field patterns during operation of a multiple grounded pin target paradigm, in accordance with features of the present invention.

FIG. 5 depicts a device for generating highly anisotropic fibers, in accordance with features of the present invention.

FIGS. 6A-B depict a low voltage switching circuit for use in one embodiment of the system;

FIG. 7 depicts a high voltage switching circuit for use in one embodiment of the system; and FIG. 8 depicts an alternative high voltage switching circuit for use in one embodiment of the system.

DETAILED DESCRIPTION OF THE INVENTION

Figure 1:
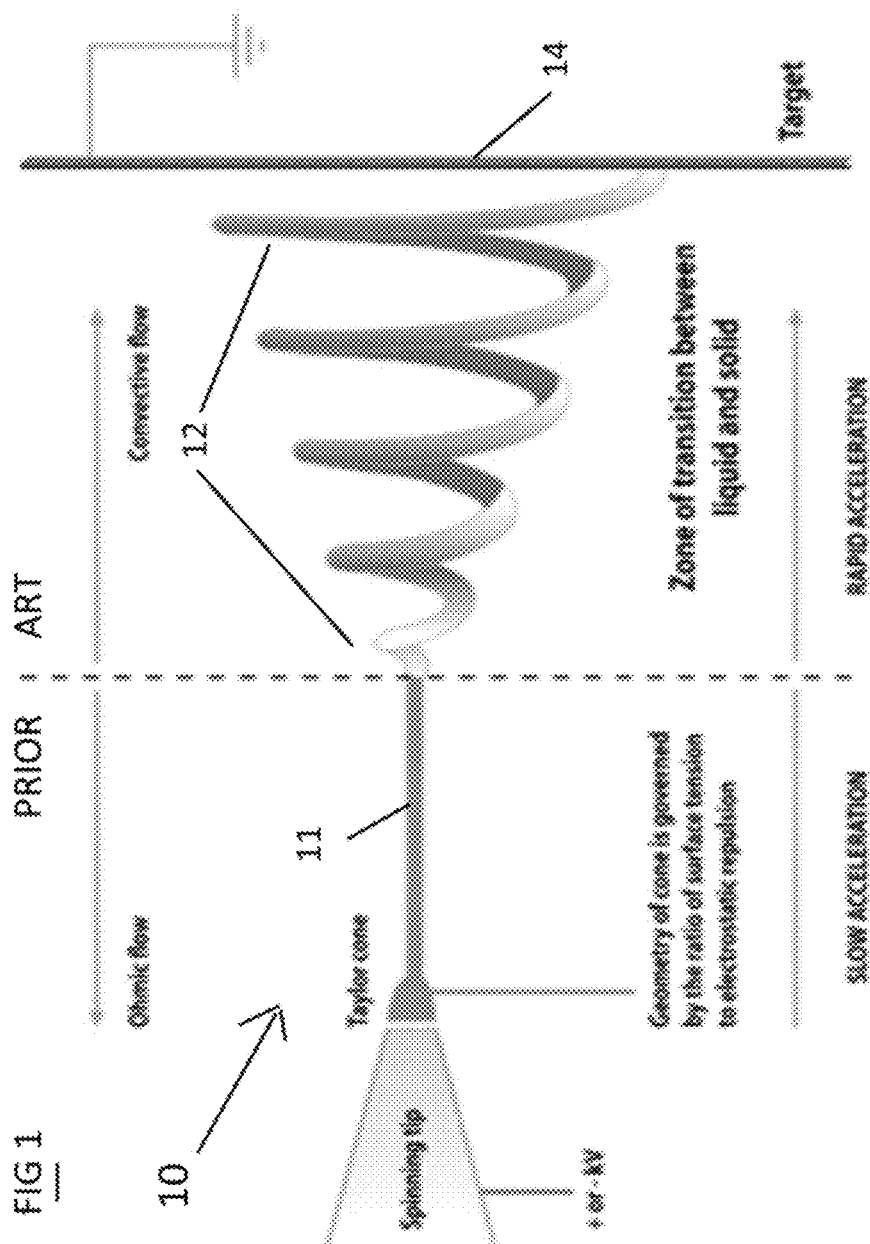
FIG. 1 depicts the convective flow of electrospun fibers in state of the art mechanically actuated spinning paradigms.

The foregoing summary, as well as the following detailed description of certain embodiments of the present invention, will be better understood when read in conjunction with the appended drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The present invention provides field controlled direct-write electrospinning technology. It features directing electrospinning targeting by actively manipulating the electrical status of components in the system to control electrical field geometry in a predetermined sequence, rather than mechanically moving the components affecting/affected by the field. These features allow for more rapid control of the electrical field, enabling the production of straight, highly anisotropic deposition of nanofibers at thicknesses (between approximately 50 nm and 2000 nm) not possible with state of the art techniques. The deposition and arrangement of fibers using the invented method can be done at any electrospinning speed inasmuch as the electric field configuration "guiding" the fibers are not reliant on moving mechanical parts.

The invented electrical switching method fully captures and matches the speed of fiber coming out of the Taylor cone. Preferably, the switching frequency times the distance between the pins matches that of the speed of fibers coming out the Taylor cone. (This speed can be up to hundreds of meters/second for fibers under 100 nm diameter). The invented switch is capable of switching at between about 1 Hz and about 100 kHz, preferably between about 10 Hz and 10 kHz, and most preferably at about 1 kHz. As such, it is possible to match very high fiber speeds, with no physical movements of hardware required. Furthermore, the deposition of the fibers also can be interrupted, then begun again if need be, given that the configuration of the electric field does not require such moving mechanical parts, such as rotary pullers, or armatures.

Generally, the invented method causes directed electrospinning of highly anisotropic nanofiber of controlled diameter to occur by switching between high and ground voltage of stationary single point electrodes arranged in a variable matrix pattern. The fibers generated have diameters between approximately 30 nm and 2000 nn, preferably between approximately 100 nm and approximately 1000 nm, and most preferably between approximately 300 nm and approximately 600 nm.

If two point electrodes are utilized, the eventual pattern will be the creation of a fiber matrix between those two points. If several point electrodes are utilized, such that the electrodes are arranged in a single plane, then a two-dimensional substrate comprising the fibers can be created. If several electrodes are utilized but placed at different levels or planes, then three dimensional structures can be generated.

Still more intricate structures can be generated if the electrodes are mobile, relative to either each other or the Taylor Cone. Specifically, when mechanical movement of components is included, more complicated patterns of depositions are possible. Such mechanical manipulation of the hardware is dictated by 3D printing programming, robotics, the inventor's previous designs as taught in his '932 U.S. Patent Application previously incorporated by reference, the inventor's other teaching disclosed in U.S. patent application Ser. No. 14/705,209 incorporated herein by reference, or a combination thereof. Digitization of mechanical movements enhances the reproducibility of the patterns produced.

Figure 2:
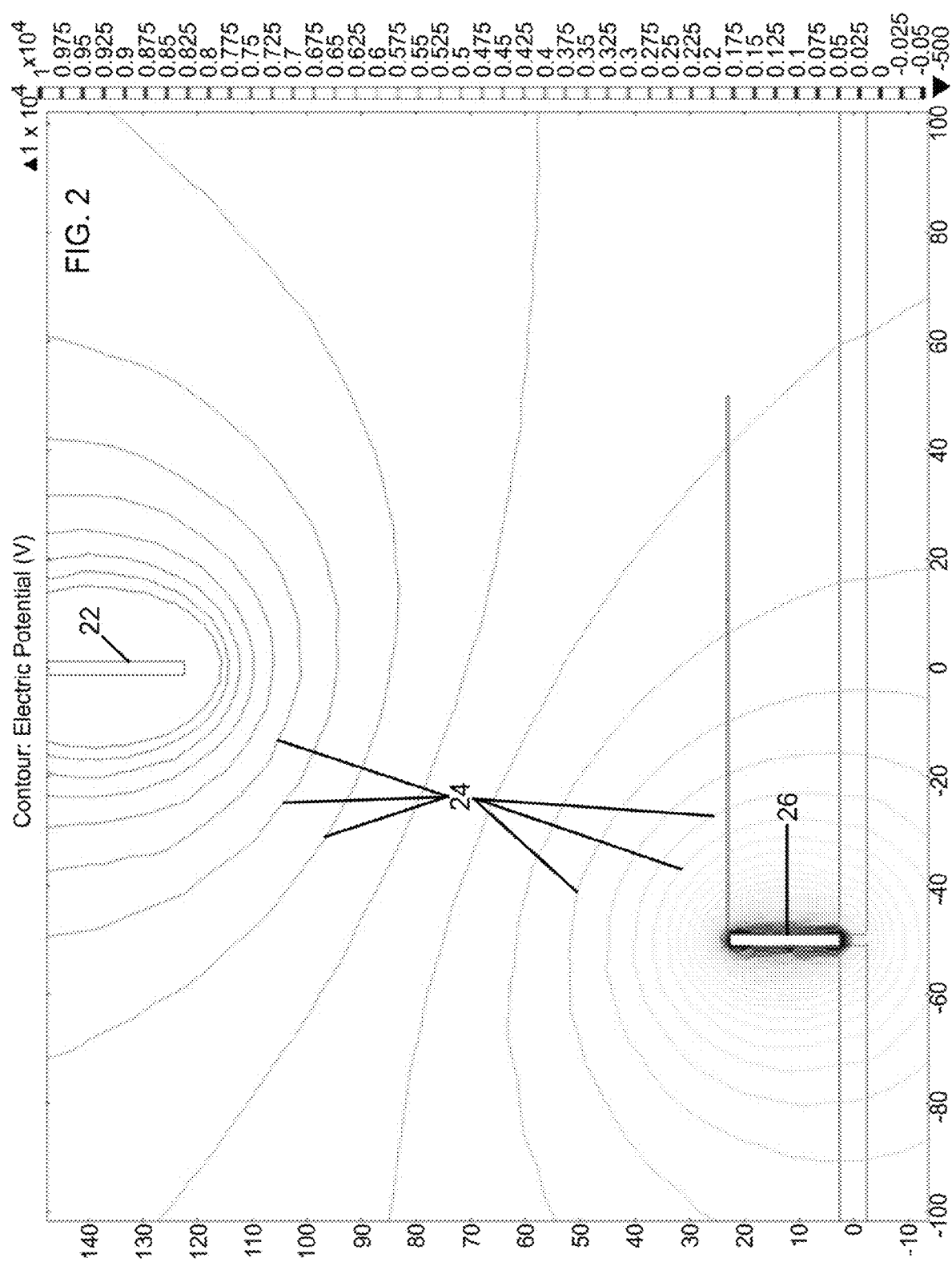
FIG. 2 depicts electric field patterns generated between a Taylor Cone, and a grounded pin.

The inventor has determined that when a single point of grounded electrical potential is present, all as-spun fibers are going to be collected in a small region around the point. This observation is depicted in FIG. 2, wherein lines 24 of electrical potential are seen concentrated around a top electrode 22 from which fiber (not shown), emanates, and a single grounded pin 26. (A Taylor cone refers to the cone observed in electrospinning, electrospraying and hydrodynamic spray processes from which a jet of charged particles emanates above a threshold voltage. The cone forms under the electric field, which a viscous liquid exits from the top electrode 22). The inventor also discovered that if a group of static points are present, where only one point is electrically grounded and the rest at floating potential, the electric field configuration is largely unaffected—fibers still only go to the grounded potential area.

Figure 3:
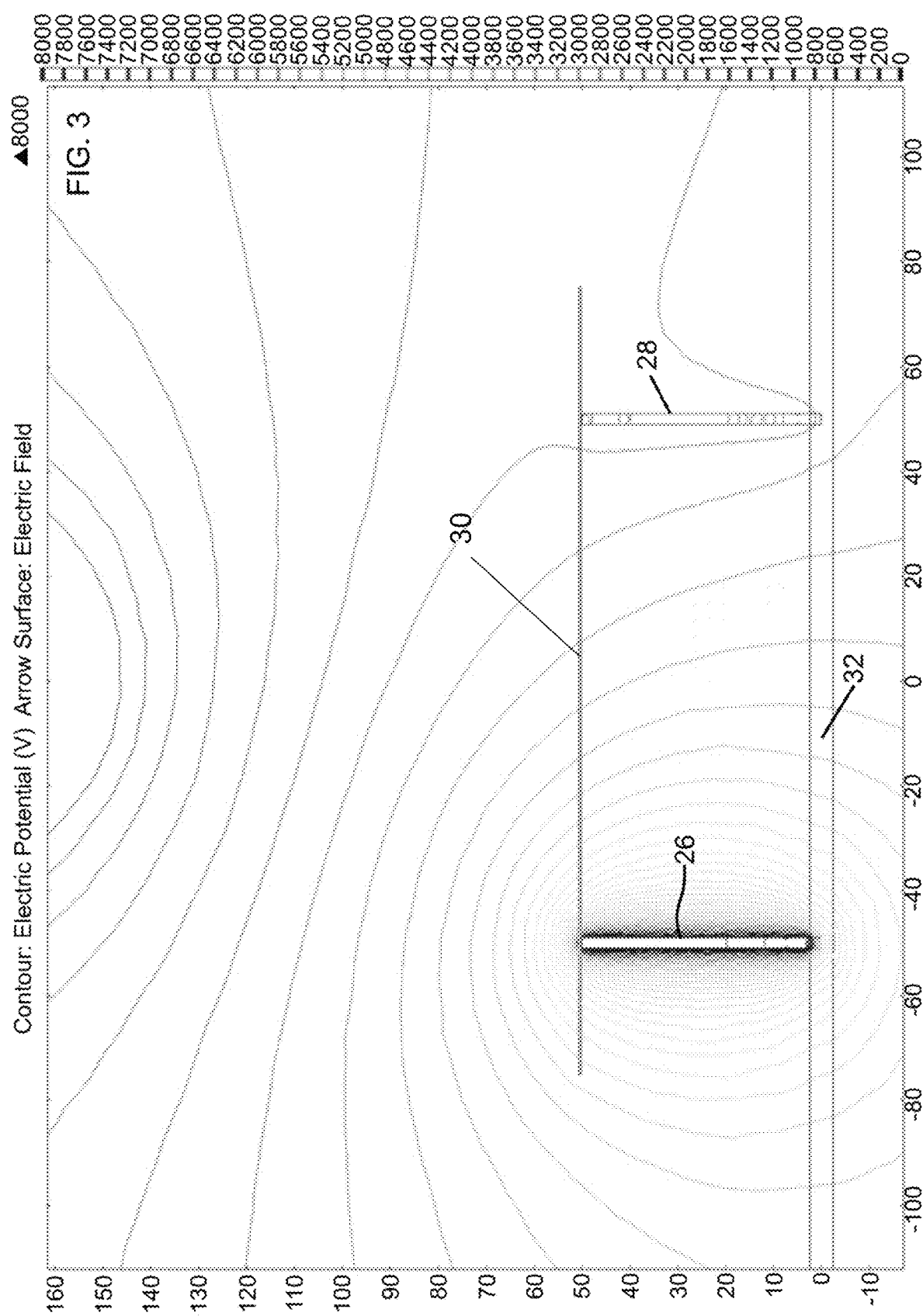
FIG. 3 depicts electric field patterns generated between a Taylor Cone and a plurality of alternately grounded pins, in accordance with features of the present invention.

FIG. 3 depicts electric field patterns generated between a top electrode (i.e., a high voltage needle where the electrospinning is initiated), a plurality of alternately grounded pins, and other pins held near an electric potential. The patterns are simulations representing the field when a first pin 26 is held at ground potential and a second point in the field is held at a voltage V2. That second point is the location of a fictitious tip of the second pin 28. In other words, V2 is the potential observed at a point in the field corresponding to the tip venue of the second pin 28 when that second pin, 28 is not present.

FIG. 3 shows that when the grounded potential point is altered between the different pin locations, for example between a first pin 26 and a second pin 28 (FIG. 3) fibers can be directed at controlled frequency targeting different pin locations. This enables directed deposition upon a substrate 30 without the need for mechanical movement of spinning apparati (such as the Taylor Cone forming under the top electrode 22) or the substrate. In the configuration depicted in FIG. 3, the substrate overlays the pins.

Suitable deposition substrates 30 are those which facilitate creation of an electrical potential between the fiber emanating from the Taylor Cone, and the pins. Generally, the substrate 30 has high enough resistance such that it does not shield the electric field configuration created by the pins. Conversely, too high resistivity may cause unwanted accumulation of charge from deposited fibers that could also alter the electric field created by the pins. Charge dissipating mechanisms (such as contacting the substrate with a conductor) may be required if high resistivity (e.g. ceramic-containing) substrates need to be utilized. One such charge dissipating mechanism is physical contact of the pin to the underside of the deposit substrate. Alternatively, moving the deposition surface away from the deposition zone after deposition will help dissipate any accumulated charge.

While exemplary deposition substrates 30 are empirically determined, substrates comprising glass, plastic, paper, ceramic, other nonferrous materials, and combinations thereof are suitable. Resistivities between approximately 1 Ohm*m and approximately $10^{10}$ Ohm*m are suitable.

Dynamic Switching Detail

Surprisingly and unexpectedly, the inventor found that in a dynamic switching situation, once a pin has been switched to ground from a floating state, it would not return to the same initial floating potential even when it is switched back to floating, because such change in electrical potential requires the movement of net charge in/out of the pin. The solution is to provide a bias voltage on pin(s) that are not at electrical ground to match the initial floating voltage. The effect on electrical field configuration is depicted in FIG. 3 wherein the electrical field lines are concentrated at both pins 26, 28.

In operation, at each point of time, one pin will be set to electric ground potential, to which fiber will be deposited. The remainder of the pins will be set to an electric potential that matches the local potential without the presence of the pin. By alternating the ground pin location, a fully controlled fiber deposition can be achieved. To obtain straight fibers between pin locations, one just needs to match the frequency of the potential switch so that the frequency multiplied by distance between the switched pins matches the length speed of electrospun fiber being deposited out of the needle. This can be estimated from electrospinning parameters or determined experimentally.

FIGS. 4A-D is a simulation of electric field configurations over a plurality (e.g. four) of time periods. The bottom (x) axis and left (y) axis are location coordinates in meters. The color legend along the right y axis voltage. The use of four time periods herein is for illustrative purposes only. Typically, dozens, hundreds or even thousands of timed intervals would be employed to repeatedly generate substrates or submodules comprised of hundreds of unidirectional fibers. These simulations are initially conducted to optimize actual conditions, determined empirically.

Figure 4A:
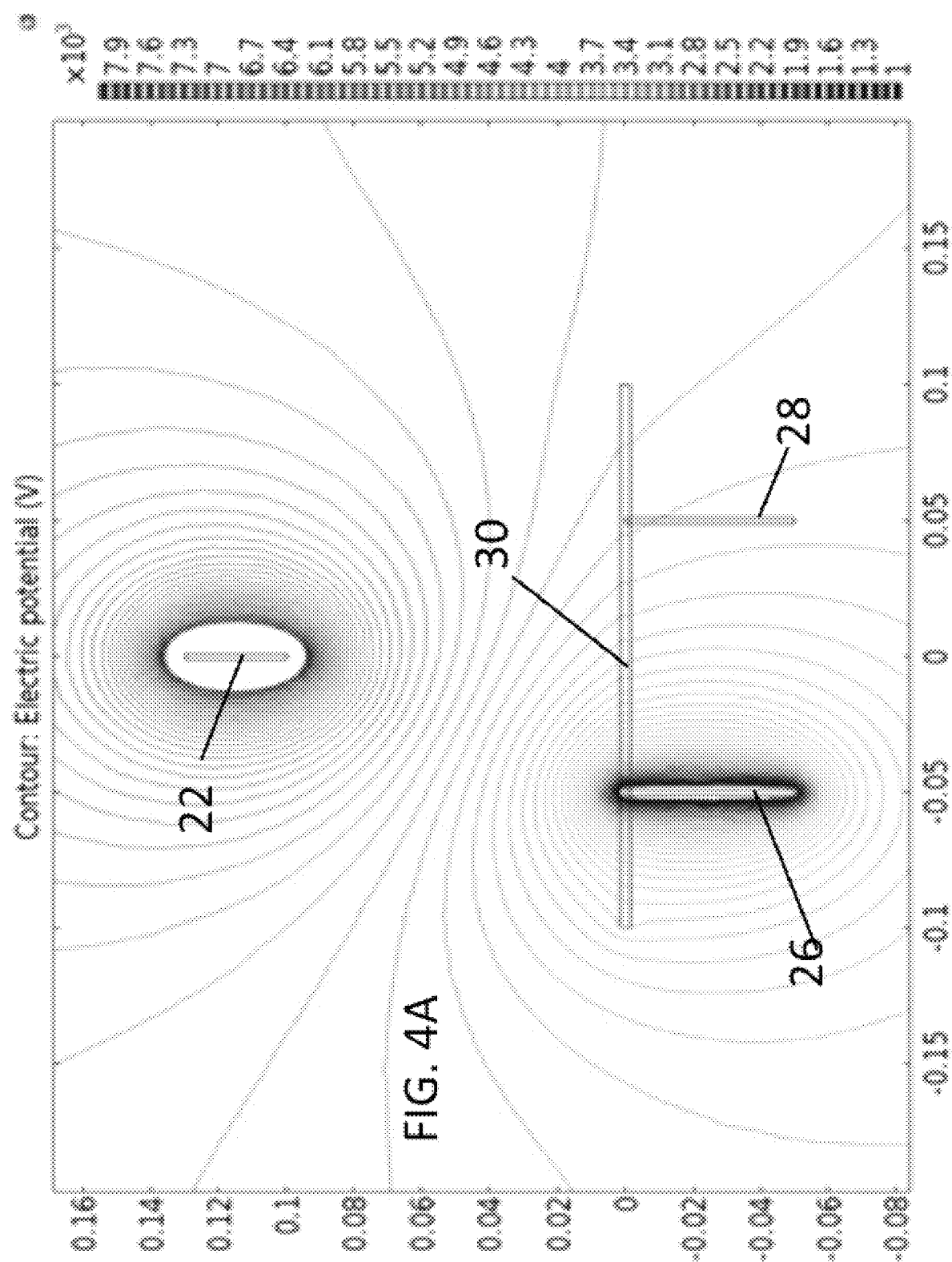

FIG. 4A is a simulated electric field depicting one floating pin 28 and a grounded pin 26. This stage in the four stage simulation calculates the initial voltage required to be maintained by the floating pin. This calculation determines the floating potential at the uncharged pin 28 in the presence of the top electrode (Taylor Cone 22) and the grounded pin, which in this point of the cycle is the first pin 26.

Figure 4C:
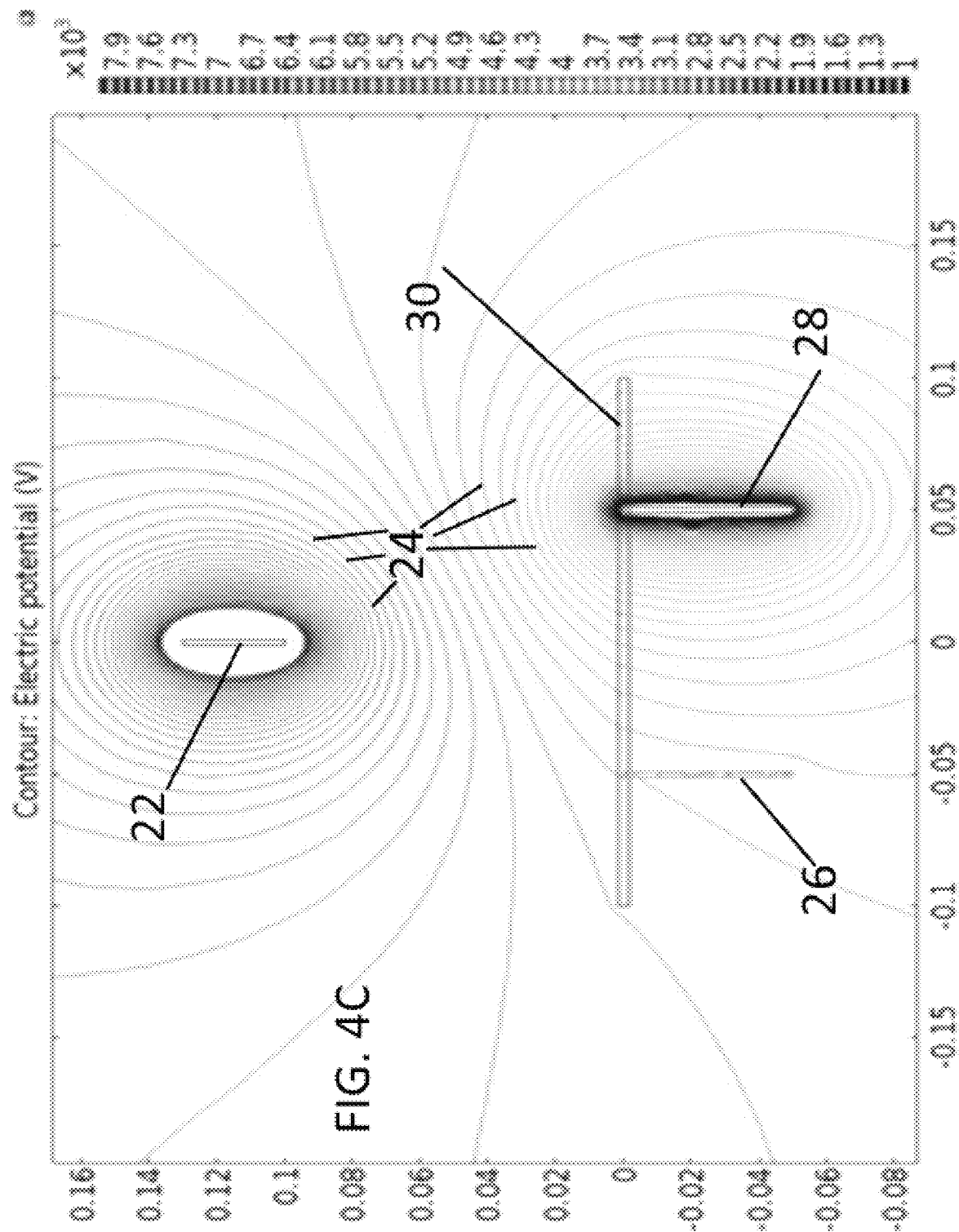

FIGS. 4B-D depict various stages of the electric field, whereby the first pin and second pin 28 alternate from grounded state (0 volts, V) to initial floating state (between about 3 kV and 8 kV). FIG. 4B shows the confluence of equi-potential field lines 24 around the first pin 26 due to its grounded state. Conversely FIG. 4C shows the confluence of field lines around the newly grounded second pin 28, whereby the first pin 26 is held in a fixed voltage state. For clarity, FIGS. 4A-D only depict equi-potential field lines 24 held at from between about 1 kV to about 8 kV. (Electric field lines are orthogonal to the equi-potential lines and are not shown in these figures.)

FIG. 4D shows the confluence of field lines back around the first pin 26 and the lack of field lines about the second pin 28. This stage mimics the stage of the system depicted in FIG. 4B, and shows the alternating states of grounding for the pins in the system. As discussed supra, several more pins can be utilized with similar effect.

FIGS. 4A-D were generated wherein semi-conductor material was used as the deposition substrate 30. The characteristics of this semi-conductor material altered the floating potential on the ungrounded pin such that only about 4-5 kV were required to maintain the viable floating potential of the ungrounded pin, versus about 7 kV when more insulating substrate (such as polytetrafluoroethylene, e.g. Teflon) is utilized.

FIG. 5 is a schematic depiction of a system for facilitating production and direction of anisotropic fiber. The illustrated system comprises a Taylor cone 22 suspended above a deposition substrate 30. Positioned proximal to an underside surface of the substrate are three pins 26, 28 and 29. (As noted supra, fewer pins, or more pins may be utilized.) A first or superior end of each of the pins are in close spatial relationship to the underside surface to direct or otherwise divert the equi-potential field lines to or away from the pins, depending on the deposition pattern sought by the operator. As such, the pins need not be in electrical contact, nor physical contact with the substrate 30. However, such electrical contact or physical contact will not obviate or otherwise adversely affect the directed deposition features of the invention method. Electrical communication between the pin and substrate does not necessitate physical contact of the pin with the substrate, and in some instances where the substrate and or pins move in relation to each other, physical contact may be an option.

A second or depending end of each of the three pins are in electrical communication with a high voltage power source 52, which in turn is controlled by a multistep controller 54. Generally, the substrate 30 is positioned between the Taylor Cone and the pins 26, 28, 29. Electrical switches 56 are disposed between the power source 52 and the depending ends of each of the pins.

FIG. 5 shows a closed switch between the power source 52 and all of the pins 26, 28, and 29. However, only one of the pins 26 is grounded while the others are maintained at a simulated floating voltage, which is at a higher voltage than that naturally found in the field, as discussed supra. The grounded state of the energized pin 26 results in fiber 23 emanating from the top electrode 22 biased toward the region of the substrate contacted by the energized pin. FIG. 5 shows the system disposed horizontally for illustration purposes only. However, as long as the pins and the Taylor cone are on opposite sides of the substrate, deposition will occur, such that gravity is not a necessary component.

High speed voltage switches drive the needles at alternating biased high voltage required for active steering of fiber deposition. The alternate application of voltages can be supplied by combining the high voltage source 52 with the controller 54 such as a two stage control box. As noted supra, and depending on the deposition substrate use, voltage ranges from about 3 kV to about 8 kV, and more typically from about 4 kV to about 7 kV. High voltage controllers are available commercially, including HTS 201-03-GSM switches from Behlke Power Electronics GmbH (Kronberg, Germany).

FIG. 6 is a schematic electrical diagram of a low voltage control signal generation circuitry utilized in one embodiment of the system.

The embodiment of the low voltage circuit 40 shown in FIG. 6 comprises two low voltage power supplies 42, 44 with a first power supply 42 providing 5V of DC power and a second power supply 44 providing 15V of DC power. In the depicted embodiment, each power supply is capable of providing approximately two Amps of power.

The circuit 40 includes two ports, a panel connector 46 and a panel receptacle 48. Each port comprises a five-conductor round plug, such as the detailed view of the plug interface shown in FIG. 6B discussed below.

The first conductor 50 of the panel connector 46 is in electrical communication with the first output port of the module 60. The first conductor 52 of the panel receptacle 48 is in electrical communication with the second output port of the module 60.

The module 60 comprises eight high-speed output channels. In one embodiment the module 60 is a correlated digital module which triggers different output channels on basis of communication signal 54. The module is driven by commercial software, such as LabView (Austin, Tex.), in which 00 and 01 port outputs square wave voltage, 180 degree out of phase. As such, when 00 is high V, 01 is low, and vise-versa. The module 60 is also supplied an input voltage 56. In the depicted embodiment the input voltage 56 is provided to the module 60 by the first power supply 42. In one embodiment, the module 60 comprises NI 9474 available from National Instruments.

The communications line is coupled to the negative line of the first power supply 42 and the second conductor 48 of the panel connector 46 as well as the second conductor of the panel receptacle 48.

The remaining conductors of the receptacle 48 and connector 46 are connected to the positive line of the first power supply 42, the positive line of the second power supply 44, and the negative line of the second power supply 44.

As shown in FIG. 6A, the Module 60 controls which of the first conductors 50, 52 of either the panel connector 46 or panel receptacle 48 will carry the voltage of the first power supply 42.

The pin layout of the receptacle 48 and connector 46, in one embodiment, is depicted in FIG. 6A. The layout comprises two conductor connection points 64, 66 on a first side of the plug, a conductor connection point 68 in the middle, and a further two connection points 70, 72 on the opposing side. In regards to the embodiment described in FIG. 6A, the first conductor corresponds to the conductor connection point 64, the second conductor corresponds to the conductor connection point 72, the third conductor corresponds to the conductor connection point 70, the fourth conductor corresponds to the conductor connection point 66 and the fifth conductor corresponds to the middle conductor connection point 68. In one embodiment, the conductors are further assigned colors, with the first conductor connection point 64 assigned white, the second conductor connection point 66 assigned blue, the middle connection point 68 assigned gray, and the last two connection points 70,72 assigned brown and black accordingly.

FIG. 7 is a schematic electrical diagram of a high voltage driver utilized in the system.

As shown in FIG. 7, the circuit 80 comprises two switching modules 82, 84 coupled to panel connectors 88. Inasmuch as the positive line 86 of each switching module 82, 84 is coupled together, in series with 100 Ohm resistors, the voltage across the output pins 90, 92 is switched.

The switches 82, 84 respond in response to voltage input. As the negative lines 94 are coupled together, both cannot complete the circuit simultaneously.

FIG. 8 is a schematic of the physical layout of the high voltage driver unit utilized in the system. The embodiment depicts a circuit 98 of high-voltage fast switching box terminal blocks. The circuit 98 comprises a positive voltage input 100 and a negative input 102. (Instead of applying ground potential on the pin that fiber deposition is directed to, one can also apply a negative potential, so as to have enhanced focus of deposition. Enabling the system to provide negative voltage is one means to enhance deposition specificity.) In one embodiment, the high voltage provided to the system is about 7 kV.

The positive input is controlled by switches 104. The negative input is controlled by switches 106. There are further two switch outputs 108. The resulting action of the circuit 98 is that the configuration of the switches determines the configuration of the output pins 110. In one embodiment, the switch outputs 108 comprise two LEDs.

An embodiment of the invention provides for mechanical movement of certain pieces of hardware of the system. The Taylor Cone 22, the pins, and/or the substrate 30 may be movable relative to each other. For example, the pins may be mounted on an x-y stage 32, or an x-y-z stage to impart movement to the pins relative to the static structures (Taylor Cone 22 and/or deposition stage 30) of the system. A myriad of x-y-z stages are available, including those from Velmex, Inc, of Bloomfield, N.Y.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A system for producing anisotropic fibers comprising:
   a. a reservoir of electrospun fiber constituent, wherein an egress point of the reservoir is electrically charged;
   b. a plurality of electrodes opposed to the egress point, wherein only one of the electrodes is grounded at any one time while the remaining electrodes are at an initial voltage state; and
   c. a target substrate disposed between the egress point and the plurality of electrodes;
   wherein said plurality of electrodes are not in physical contact with said target substrate; wherein individual electrodes comprising the plurality of electrodes switch from ground to a bias voltage different from the ground voltage said switching occurring at a switching frequency and wherein said switching frequency is selected to match the speed of fibers exiting said egress point to obtain straight fibers between electrodes comprising the plurality of electrodes.

2. The system as recited in claim 1 further comprising a power source and a controller wherein the power source provides a ground to each of the electrodes comprising the plurality of electrodes in a predetermined sequence and for a predetermined period of time.

3. The system as recited in claim 2 wherein the power source provides voltage to previously grounded electrodes, such that the provided voltage matches the initial voltage state.

4. The system as recited in claim 1 wherein the egress point, the plurality of electrodes and the target substrate are not subject to mechanical movement relative to each other.

5. The system as recited in claim 1 wherein the egress point, the plurality of electrodes, and the target substrate are movable, relative to each other.

6. The system as recited in claim 1 wherein a first end of each of the electrodes reside in the same plane and the first ends contact the target substrate.

7. The system as recited in claim 1 wherein a first end of each of the electrodes do not reside in the same plane.

8. The system as recited in claim 1 wherein a first end of each of the electrodes reside in the same plane and the first electrodes do not contact the target substrate.

* * * * *